(12) United States Patent
Adams

(10) Patent No.: US 10,121,003 B1
(45) Date of Patent: Nov. 6, 2018

(54) DETECTION OF MALWARE, SUCH AS RANSOMWARE

(71) Applicant: Amazon Technologies, Inc., Seattle, WA (US)

(72) Inventor: Gavin Anthony Adams, Cumming, GA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/385,099

(22) Filed: Dec. 20, 2016

(51) Int. Cl.
G06F 21/56 (2013.01)

(52) U.S. Cl.
CPC ...... G06F 21/565 (2013.01); G06F 2221/034 (2013.01)

(58) Field of Classification Search
CPC .................. G06F 21/565; G06F 2221/034
See application file for complete search history.

(56) References Cited

U.S. PATENT DOCUMENTS

| 6,323,882 | B1* | 11/2001 | Jerome | G05B 19/41865 |
| | | | | 715/744 |
| 2010/0235392 | A1* | 9/2010 | McCreight | G06F 17/30949 |
| | | | | 707/780 |
| 2010/0281540 | A1* | 11/2010 | Alme | G06F 21/563 |
| | | | | 726/23 |
| 2011/0083186 | A1* | 4/2011 | Niemela | G06F 21/566 |
| | | | | 726/24 |
| 2011/0252474 | A1* | 10/2011 | Ward | G06F 21/56 |
| | | | | 726/23 |
| 2012/0278884 | A1* | 11/2012 | Menoher | G06F 21/564 |
| | | | | 726/22 |
| 2013/0046741 | A1* | 2/2013 | Bentley | G06F 17/3023 |
| | | | | 707/695 |
| 2015/0058987 | A1* | 2/2015 | Thure | G06F 21/554 |
| | | | | 726/23 |
| 2017/0140156 | A1* | 5/2017 | Gu | G06F 21/602 |
| 2017/0223031 | A1* | 8/2017 | Gu | H04L 63/1416 |
| 2017/0262633 | A1* | 9/2017 | Miserendino | G06F 21/566 |

FOREIGN PATENT DOCUMENTS

WO    WO 2017053745 A1 *   3/2017   ........... G06F 21/566

OTHER PUBLICATIONS

Hartman, Kenneth G., "Calculate File Entropy", http://www.kenethghartman.com/calculate-file-entropy/, May 18, 2013, 3 pages.

(Continued)

Primary Examiner — Meng Li
(74) Attorney, Agent, or Firm — Lee & Hayes; Charles L. Warner

(57) ABSTRACT

Methods and devices for detection of malware, such as ransomware, are disclosed. Ransomware encrypts files, making them useless to the owner. The entropy value of files is calculated and, in response to a predetermined event, such as a write operation to the file, a new entropy value is calculated. If the change in entropy value exceeds a threshold, or if the magic number of a file is missing or is inconsistent with the file type, then malware may be present. Steps are then taken to prevent further encryption by the malware.

20 Claims, 9 Drawing Sheets

(56) References Cited

OTHER PUBLICATIONS

Hartman, Kenneth G., "Shannon Entropy of Various File Formats", http://www.kenethghartman.com/shannon-entropy-of-file-formats/, May 19, 2013, 7 pages.
"Keeping Pace With the Creation of New Malicious PDF files using an active-learning based detection framework", Dec. 2016, ResearchGate, 21 pages.
Wagner, Neal R., "The Laws of Cryptography: Coding and Informaton Theory", 2001, 7 pages.

\* cited by examiner

DETECTION OF MALWARE, SUCH AS RANSOMWARE

BACKGROUND

Malware is continually evolving. One type of malware is commonly referred to as "ransomware" because it encrypts the user's files, thereby rendering them useless, until the user pays a ransom and (hopefully) is provided with a decryption key whereby the user can decrypt and gain access to the files.

DETAILED DESCRIPTION

The following detailed description is directed to concepts and technologies for detection of malware, advanced persistent threat malware, such as ransomware. The operation of malware, such as ransomware, on a system may be detected by monitoring the entropy of files on a system to detect an excessive or unexpected number of encrypted files, by monitoring for write operations which increase the entropy of a file beyond an expected entropy value, and/or by monitoring for files which have a missing magic number and/or have a magic number that does not match the file type suffix.

Figure 1:
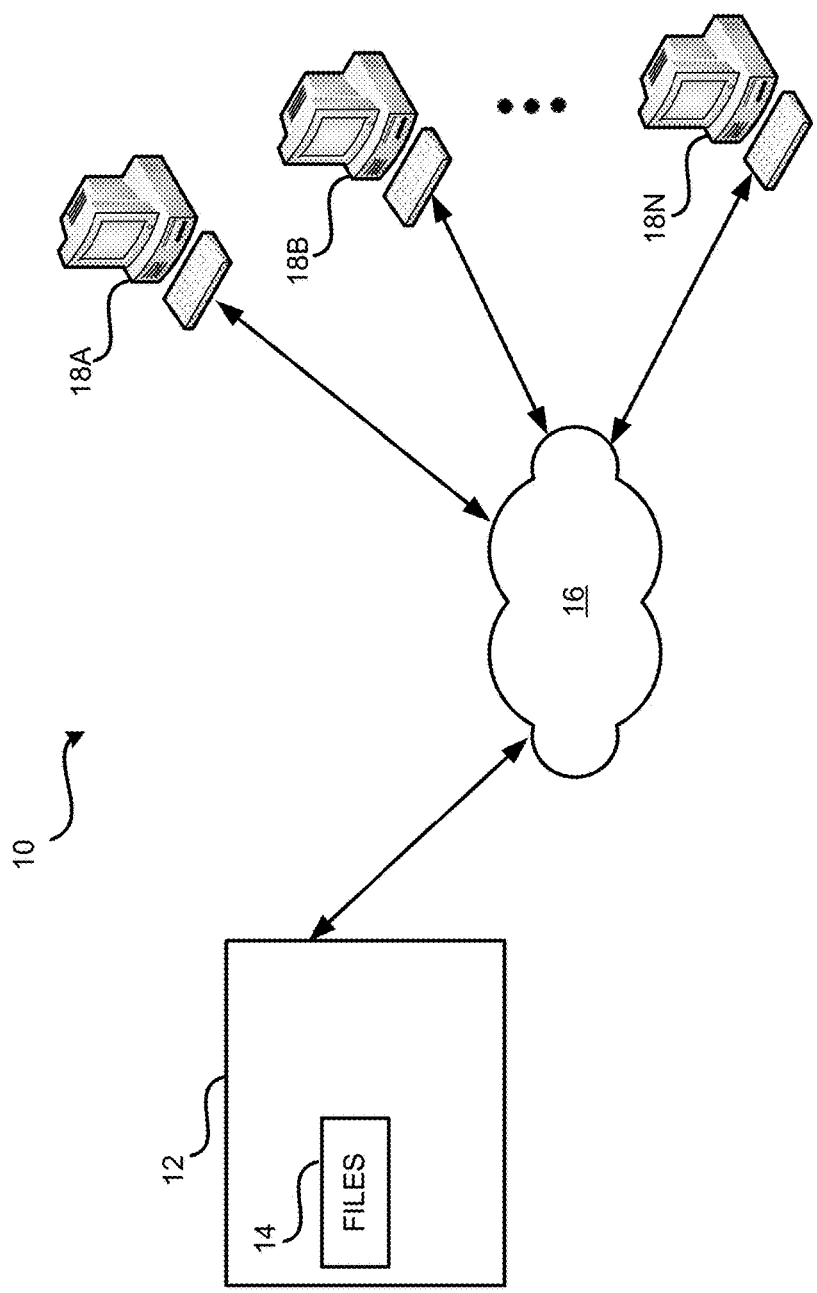
FIG. 1 illustrates an exemplary operating environment having a server and workstations.

FIG. 1 illustrates an exemplary operating environment 10 having a server 12 and workstations 18A-18N. The workstations 18A-18N can communicate with the server 12 via a network 16. The workstations 18A-18N might be referred to herein in the singular or generally as a workstation 18, or in the plural or generally as workstations 18, depending upon the context of the sentence. The network 16 may be a LAN, WAN, the Internet, other communications network, or a combination of one or more thereof. The server 12 has a plurality of files 14 stored therein. The files 14 might be referred to herein in the singular or generally as a file 14, or in the plural or generally as files 14, depending upon the context of the sentence. Further, the entirety of the files 14 may be referred to herein as the file system 14. A workstation 18 can access (read) and open a file 14 on the server 12, modify the file 14, and cause the server 12 to replace (store) the original file 14 with the modified file. A workstation 18 can also open and close a file 14 without modifying it. The file 14 may be any type of file which can be opened, modified, and stored. A few examples of file types are: ASCII text, an Adobe™ Photoshop image, a Portable Document Format file, an Adobe Illustrator™ image file, a Microsoft™ Outlook™ message, GIF image data, gzip compressed data, an HTML file, ISO MP4 media, a JPEG image data, a text file, a Microsoft Word™ file, a WordPerfect™ file, a Microsoft Excel™ file, a Microsoft PowerPoint™ file, a Microsoft Visio™ file, a word processing document, a spreadsheet, a drawing file, an image file, a 3D image file, a raster image file, a vector image file, a page layout file, a database file, an audio file, a video file, an executable file, a game file, a geographical information system file, a computer aided drawing file, a web file, a font file, a system file, a settings file, an encoded file, a compressed file, a disk image file, an application development file, a backup file, a javascript object notation file, an extensible markup language file, an unstructured data file, etc., and the different versions thereof. These file types are only a few of the commonly used file types, and many other file types are well known and used.

The server 12 typically and preferably has an anti-malware program on it. Preferably, each workstation 18 also has an anti-malware program. Malware is continually evolving, however, and an uneducated or inattentive user may click on a link which causes malware to be installed despite the anti-malware program. As mentioned above, one type of malware is commonly referred to as "ransomware."

One type of ransomware is known as "flash" ransomware, which attempts to encrypt the files 14 as rapidly as possible. This generates a high level of computer activity and may alert the anti-malware software. Another type of ransomware is known as "advanced persistent threat" ransomware, which attempts to avoid detection by operating surreptitiously, such as at a slow, but usually steady, pace, such as one file 14 every second, or every few seconds, or every few minutes, etc. Thus, advanced persistent threat ransomware slowly, but steadily, accesses and encrypts the files 14. Once the ransomware has operated for a period of time, or encrypted a number of files 14, encrypted a percentage of the files 14, or in response to a command or some other event or trigger, the ransomware may send a notice to the user or owner that the files 14 have been encrypted, and specifying how much the user must pay in order to obtain a decryption key. The ransomware may encrypt individual files, or may encrypt cached blocks of information. A cached block of information may contain all or parts of one or more files. For convenience of discussion, and to avoid the reading burden of numerous instances of "file or cached block of information," the term "file" as used herein also generally includes a cached block of information, except where the context indicates the terms "file" and "cached block of information" are to be treated differently.

If a server has millions of files 14, and a large number of the files 14 are not in common use, or are archive files, then the ransomware may be able to encrypt a large number of files 14, or even most or all the files 14, before a problem is noticed, the cause of the problem is detected, or the ransomware sends notice to the user. If this type of ransomware is operating on the server 12 or one of the workstations 18, then the number of files 14 which are encrypted will steadily grow. By the time that the encrypted files manifest themselves as problems, the cause of the problems is found, and/or the ransomware sends the notice, any backups containing unencrypted data may have already been destroyed or written over in accordance with a company file retention/destruction policy, so that the available backups only have encrypted versions of many of the files 14 and, therefore, are of limited utility for restore operations.

A file 14 has a characteristic or property known as entropy, expressed as an entropy value, which is a measure of randomness, and can be thought of as the ability of the file 14 to be compressed or encrypted. A text file, for example, typically can be substantially compressed, so it can be thought of as having a low randomness and a low entropy value. A file containing truly random data would likely be of little or no use in most situations, other than, perhaps, for testing a program to determine proper operation, robustness, etc. A compressed file, or an encrypted file, however, can only be compressed by a small amount, if at all, so it can be thought of as having a high randomness and a high entropy value. Many programs today provide at least some measure of file compression as part of their normal operation to reduce the size of the file. Such compression typically results in file entropy values which are high, for example, at least 0.91. Encrypted files typically result in even higher file entropy values, for example, at least 0.991. Thus, if a file 14 has a high entropy value, there is a high probability that it has been compressed and/or encrypted. These are general values, and are not strict limits.

Figure 2:
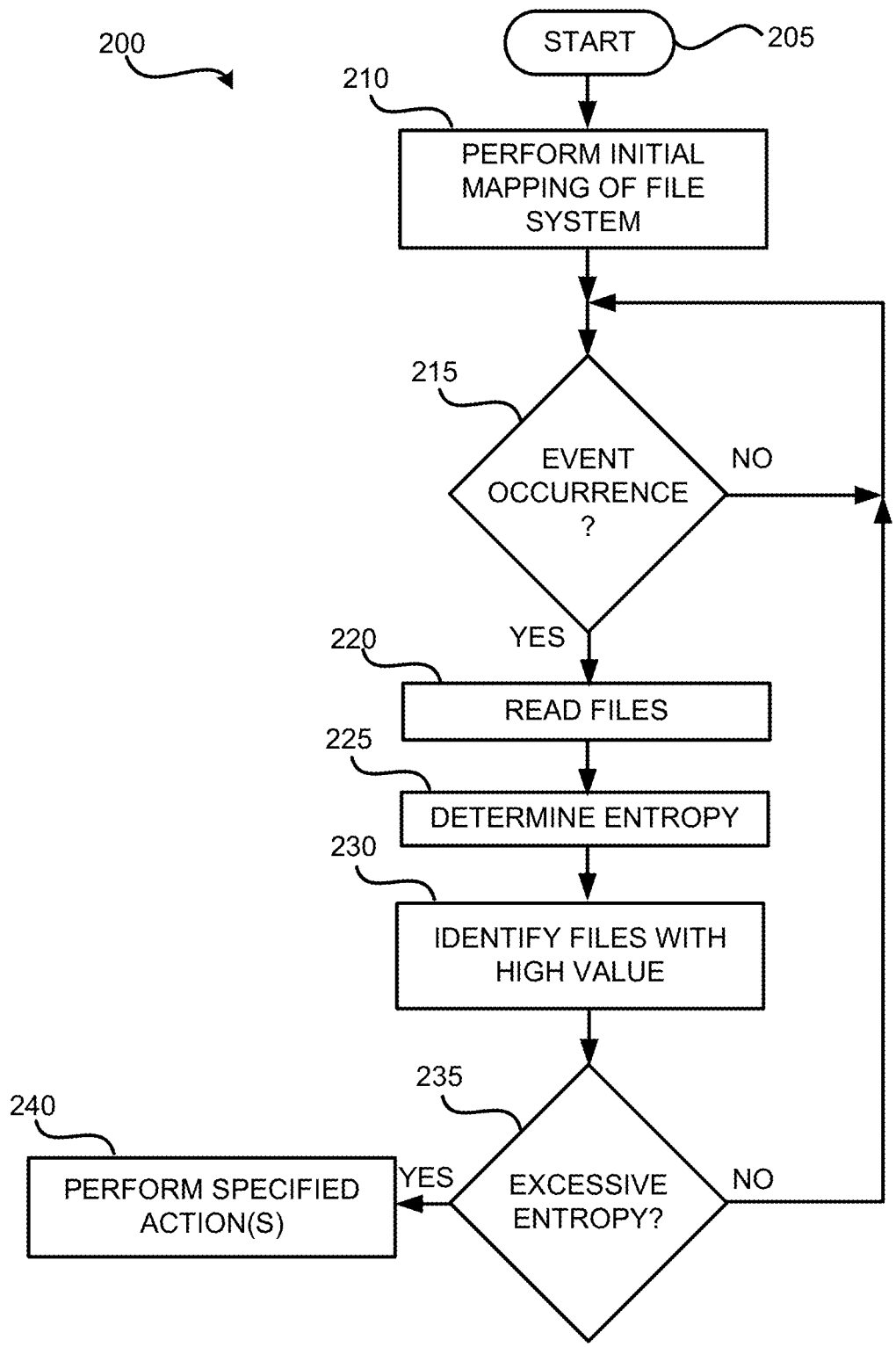
FIG. 2 is a flowchart of an exemplary procedure illustrating detection of malware, such as ransomware.

FIG. 2 is a flowchart of an exemplary procedure 200 illustrating detection of malware, such as ransomware. This process may be performed by the server 12, or may be performed by a designated workstation 18 of the workstations 18A-18N, such as workstation 18N. Processes performed by the server 12 may be considered as performed in the control plane, and processes performed by a workstation 18 may be considered as performed in the data plane. For convenience of discussion below, assume that the workstation 18N performs the process 200; that is, the process is performed in the data plane.

The mere presence of one or more encrypted files does not necessarily indicate that ransomware has been encrypting the files. In a typical system 10, some of the files 14 will have been encrypted for one or more valid reasons, such as for security in case access to the server 12 is obtained by an unauthorized source. For example, medical records, stock information, banking information, customer lists, etc., may be encrypted. Therefore, to detect the presence and operation of ransomware, the workstation 18N determines whether an unacceptable number or percentage of files have a high entropy value.

Upon starting 205, the system 12 or workstation 18N performs an initial mapping 210 of the file system 14. The initial mapping may include the following operations:

For each file 14 where the type of file can be identified:

Calculate the initial entropy value of the file. This may be accomplished, for example, by calculating the initial entropy value per byte of the file 14, and then calculating the initial entropy value for the file 14 based on the average of the entropy value per byte. This procedure prevents a single byte with a high entropy value from significantly affecting the entropy value of a file 14 when the file 14 is a small file. Alternatively, the initial value of a section (a predetermined number of bytes) may be calculated, and then the initial entropy value for the file 14 is calculated based on the average of the entropy value per section.

Calculate standard deviation/sigma values for the file.

Store the file identification, the file name, the file signature, the initial entropy value, and the standard deviation/sigma values.

For files 14 where the type of file cannot be identified:

Categorize the file 14 as a "data" file.

Calculate an average entropy value and standard deviation/sigma values, as described above for identified files.

Store the file identification, the file name, the file signature, the initial entropy value, and the standard deviation/sigma values.

Optionally, determine a threshold level for the entropy value of the file system (the average entropy value for all files of interest).

Optionally, determine other criteria which may, if desired, be used to detect the operation of malware on a file or file system, such as 1- or 2-sigma values, which may be calculated based on the files, or may be a user-settable value.

The entropy value of a file or the file system may be determined by using, for example, Shannon's entropy equation. The entropy value may also be determined by using another equation or process if desired.

The workstation 18N monitors 215 for occurrence of a predetermined event. The predetermined event may be, for example, a predetermined date/time, a predetermined amount time since the last predetermined event occurred, the creation (storing) of a new file, the modification of an existing file, such as a write operation, a command from an authorized user, etc. If the predetermined event has not occurred the workstation 18N returns to operation 215. The workstation 18N may also perform other duties or operations before or after returning to operation 215. For example, the workstation 18N may be used as a workstation by a customer service representative or an IT manager, may be used as a backup control system, etc.

If the predetermined event has occurred the workstation 18N reads 220 one or more files 14 from the server 12. The files 14 and number of files 14 which are read may be selected based upon the file being changed, based on the date of creation, based on date of last modification, based on size, based on document type, based on location in the file system 14, on a random basis, based on recent file types accessed, based on recent files created, based on other criteria, or based on a combination of one or more thereof.

The workstation 18N reads or determines 225 the entropy value of each of the selected files and/or determines a new entropy value for the file system. If an entropy value has already been determined and stored for a file 14 then that stored entropy value may be read. If an entropy value has not already been determined and stored for a file 14 then the entropy value for that file 14 may be calculated and, preferably, but optionally, stored. Preferably, new entropy values and other information that was newly calculated for a file or files, or for the file system, will be stored.

The workstation 18N identifies 230 files having a high entropy value by determining whether the entropy value of each file is greater than a threshold entropy value. As mentioned, files with a high entropy value are likely to be compressed or encrypted files. For entropy values determined using Shannon's entropy equation, the entropy value of a file will generally be at least 0.91 for a compressed file, and at least 0.991 for an encrypted file. As mentioned above, these are not strict limits. Different threshold values may be used if desired. Higher threshold values will result in fewer files being labeled as encrypted, thus possibly delaying detection of the ransomware; lower threshold values will result in a higher number of files being labeled as encrypted, thus possibly unnecessarily indicating that ransomware has been detected, thereby degrading the performance of the server 12.

The workstation 18N may determine 235 whether there is excessive entropy. That is, whether an excess of high entropy files is present, such as by determining whether the number of high entropy files or the percentage of high entropy files exceeds a threshold value. For example, is the number or percentage of files having high entropy values larger than would be expected for normal operations? Additionally, or alternatively, the workstation 18N may determine whether the new entropy value for the file system is excessive. This may be based on a fixed threshold value, or based on the change between the previous entropy value and the current entropy value of the file system being above a threshold value. If an excessive entropy condition is not present, the workstation 18N returns to operation 215, and may also perform other duties or operations before or after returning to operation 215.

If an excessive entropy condition is present, such as the number or percentage of files with a high entropy value is larger than would be expected for normal operations (e.g., larger than a threshold value), or the new entropy value or the change in the entropy value for the file system is excessive, then it is likely that ransomware is in operation. Therefore, the workstation 18N performs 240 one or more specified action(s) regarding the malware. The workstation 18N may then return to operation 215, stop operation for a certain time or until an operator takes a certain action, or perform other operations.

Optionally, during operations 220-230 above, if the entropy value of a file or the file system changes by more than a threshold value amount, then operation 240 may be commenced at that point rather than waiting for additional files to be scanned and evaluated.

Performing 240 the specified action(s) regarding the malware may be, for example, one or more of: to lock one or more of the files 14; to make one or more of the files 14 to be read-only; to cause attempted modifications of one or more of the files 14 to be recorded as new or different files, or different versions, so that an original file 14 is not affected but the modified file can be written and stored to allow business operations which require updating and modification of files to continue until the ransomware is removed; to cause a copy of at least some files to be sent to a backup server (not shown); to send an alert to one or more human operators; and/or to postpone or stop any scheduled destruction, erasing, writeover, etc. of backup tapes or files or systems. As mentioned above, the operations of FIG. 2 may also be performed by the server 12.

Figure 3A:
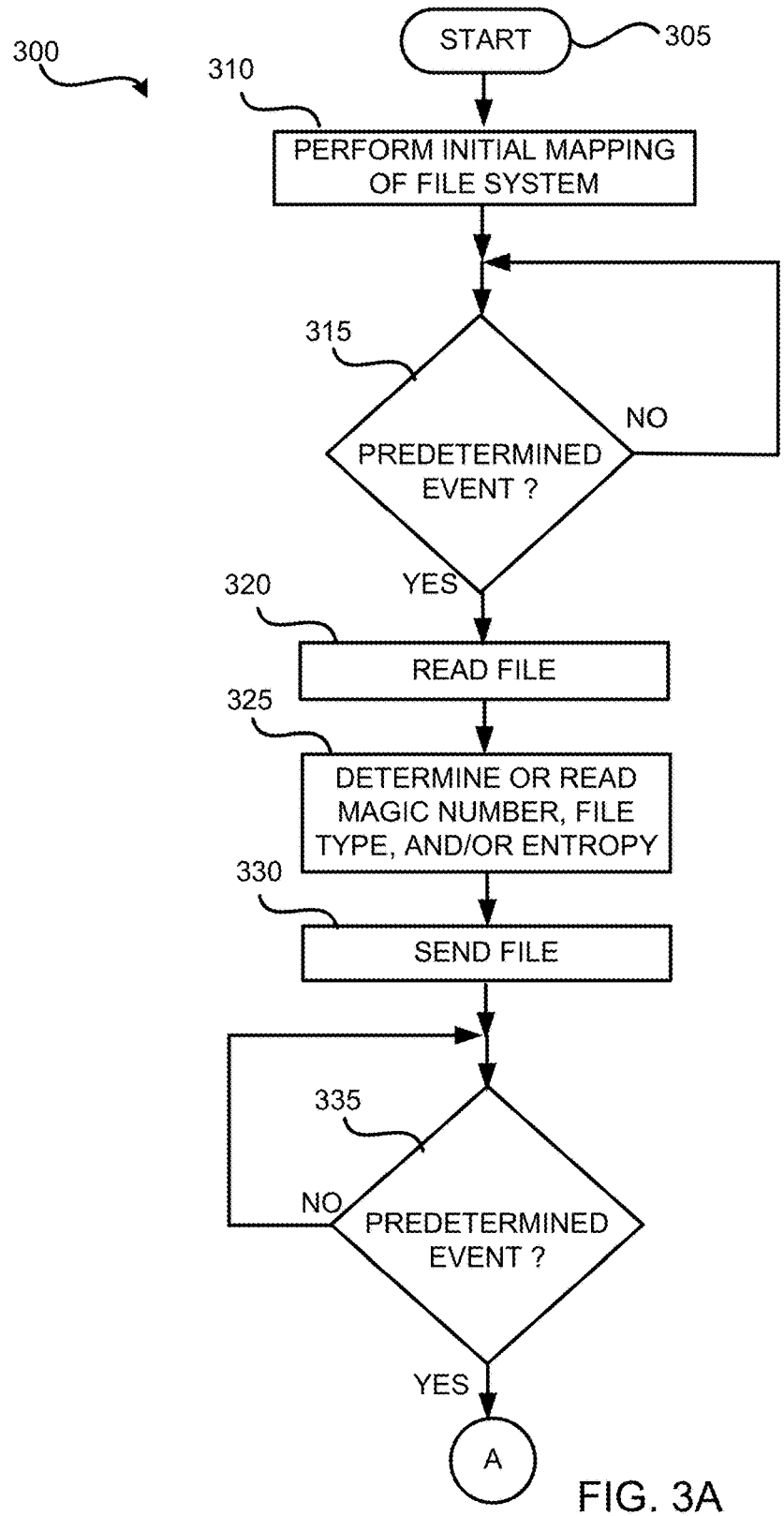
FIGS. 3A and 3B are a flowchart of another exemplary procedure illustrating detection of malware, such as ransomware, by a server.
Figure 3B:
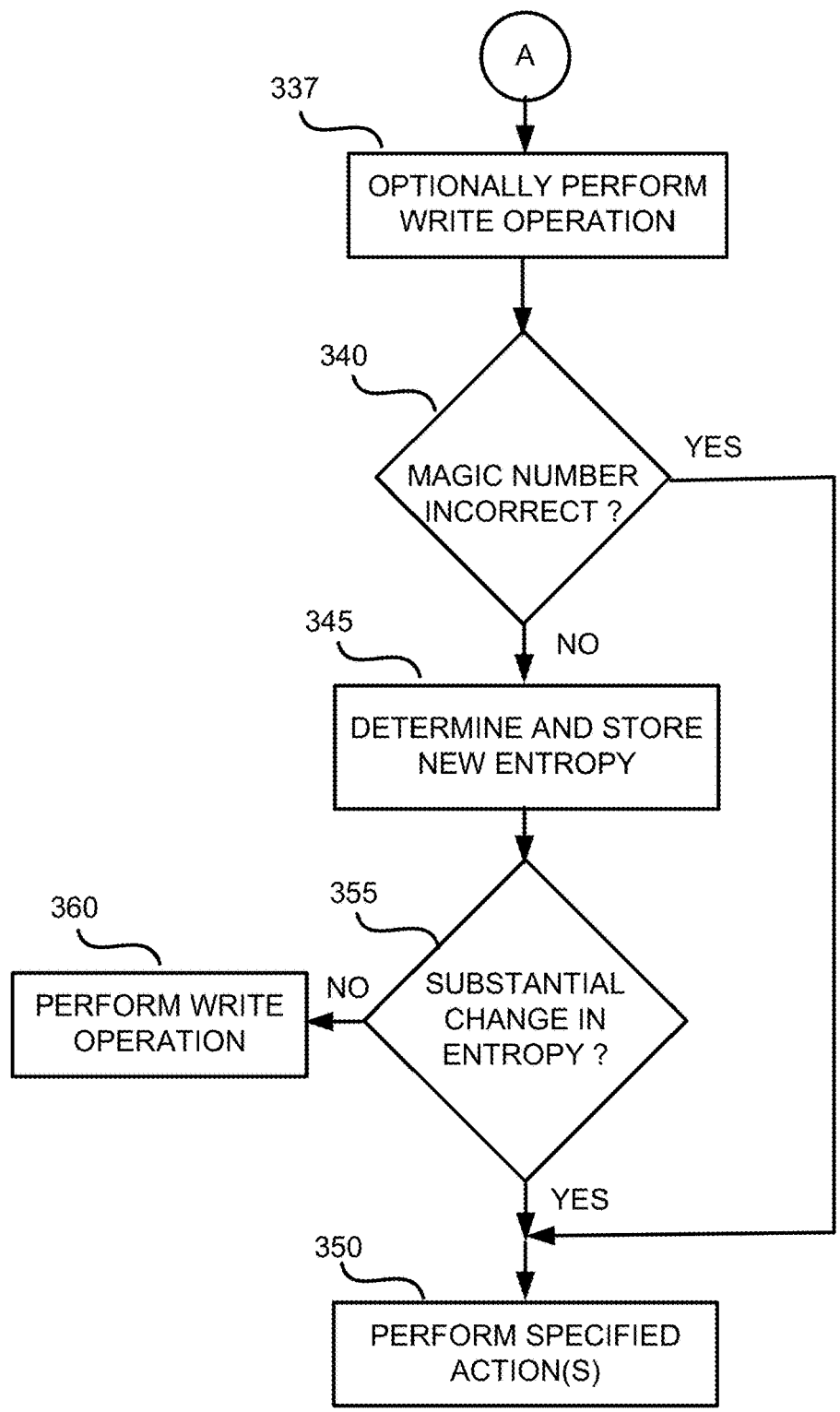

FIGS. 3A and 3B are a flowchart of another exemplary procedure 300 illustrating detection of malware, such as ransomware, performed by the server 12. Upon starting 305, the system 12 performs an initial mapping 310 of the file system 14 as described in operation 210 above.

The server 12 monitors 315 for a predetermined event, such as a read request from a workstation 18. If the predetermined event has not occurred, the server 12 continues monitoring 315 and may perform other operations as well. If a read operation was requested, the server 12 reads 320 the file 14, determines 325 the "magic number" and/or the file type suffix of the file 14, and reads the entropy value of the file 14 if already calculated and stored, or calculates the entropy value of the file 14 if not already calculated and stored and, preferably, but optionally, stores the calculated entropy value of the file 14 if that value was not previously determined and stored. The magic number of a file 14 is a set of bits at the beginning of a file 14 and uniquely identifies the type of file. The file type suffix is a suffix added to the file name which also identifies the type of file 14, such as .doc, .docx, .wpd, .pdf, etc. The server 12 also sends 330 the requested file 14 to the requesting workstation 18.

The server 12 then monitors 335 for a predetermined event, such as a write request for the file 14 by the requesting workstation 18. If the predetermined event has not occurred, the server 12 continues monitoring 335 and may perform other operations as well.

If a write operation for that file 14 is subsequently requested, the server 12 may optionally perform 337 the requested write operation. It is preferable, however, that the write operation not be performed at this point because, if the workstation 18 has been infected with ransomware, then performing the write operation at this point may overwrite the existing file with an encrypted file.

The server 12 determines 340 whether the magic number is incorrect or missing. A change in the magic number, or a missing (absent) magic number, indicates a high likelihood that the file has been encrypted. Also, if the magic number does not match the file type suffix, this also indicates a high likelihood that the file has been encrypted.

If the magic number is incorrect or missing the server 12 performs 350 the specified action(s) mentioned in operation 240 above. The server 12 may perform other operations as well. In an alternative embodiment, operation 340 is not performed. In another alternative embodiment, an operation, such as operation 340, may be performed immediately after operation 325 so that an encrypted file 14 is detected after a read operation and even without, or before, a later write operation.

Some "smart" ransomware may, however, take steps to recognize and not change the magic number. If the magic number is present and not incorrect or, alternatively, if operation 340 is not performed, the server 12 determines and stores 345 a new entropy value for the file, that is, the entropy value for the modified version of the file.

The server 12 then determines 355 whether the new entropy value represents a substantial change from the previous entropy value. A substantial change in the entropy value, especially a substantial increase in the entropy value, indicates a high likelihood that the file 14 has been encrypted. What constitutes a substantial change may vary depending upon the file type, as discussed below. If the entropy value has substantially changed the server 12 performs 350 the specified action(s) mentioned in operation 240 above. The server 12 may perform other operations as well.

If the magic number is present and is not incorrect, and there has not been a substantial change in the entropy value, the write operation is performed 360 if not already performed at operation 337. Delaying execution of the write operation until after operation 337 has been performed decreases the likelihood that the existing file 14 will be overwritten with an encrypted file. The server 12 may perform other operations as well. The operations of FIGS. 3A and 3B are preferably performed each time there is a read or write request for a file 14, including a request to write (store) a new file 14.

Figure 4A:
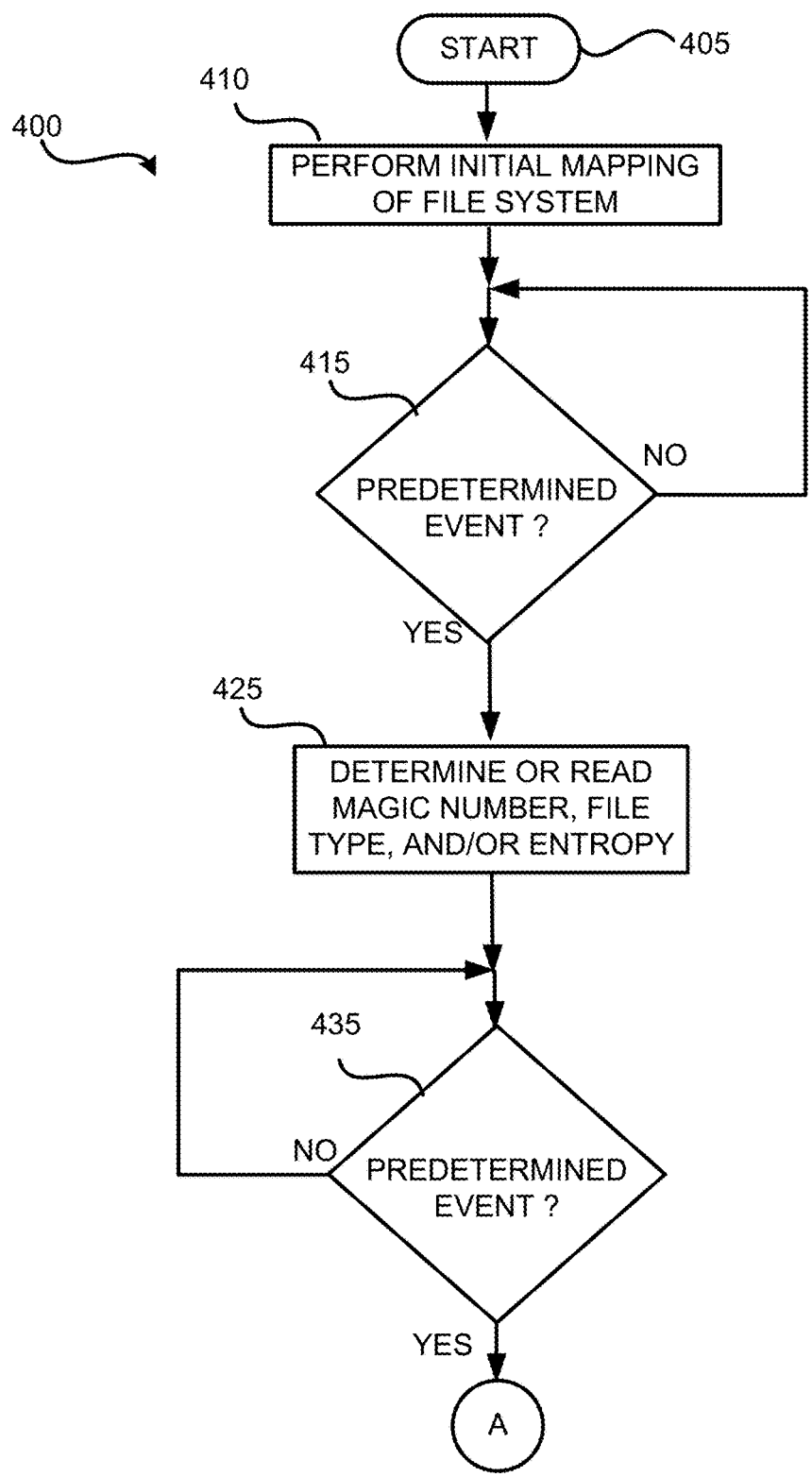
FIGS. 4A and 4B are a flowchart of another exemplary procedure illustrating detection of malware, such as ransomware, performed by a workstation.
Figure 4B:
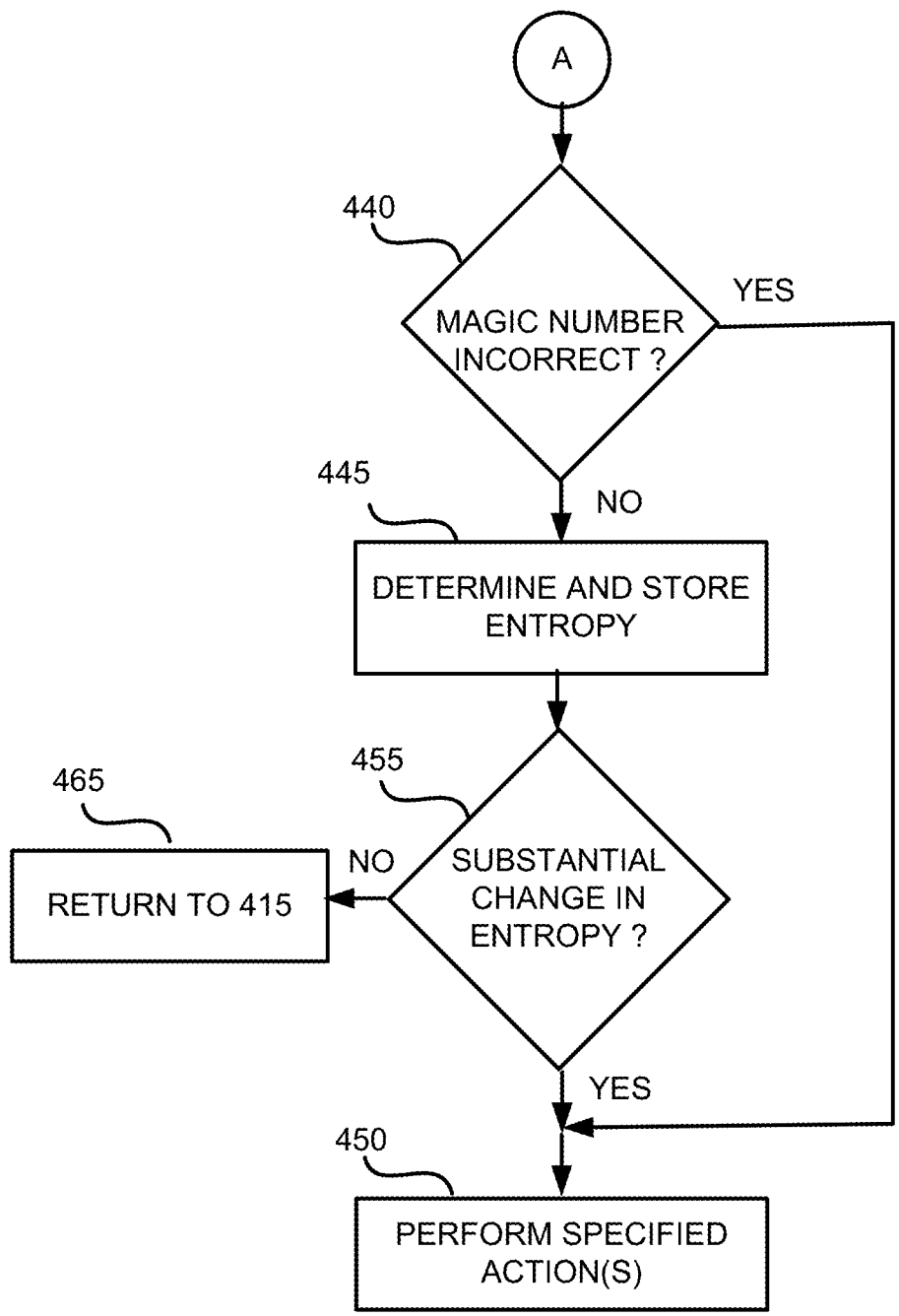

FIGS. 4A and 4B are a flowchart of another exemplary procedure 400 illustrating the detection of malware, such as ransomware, performed by a designated workstation, such as workstation 18N. Upon starting 405, workstation 18N performs an initial mapping 410 of the file system 14, as described in operation 210 above. The workstation 18N monitors 415 for a predetermined event, such as a read request to the server 12 from another workstation 18. If the predetermined event has not occurred, the workstation 18N continues monitoring 415 and may perform other operations as well. If a read operation was requested, the workstation 18N obtains the file 14 from the server 12, determines 425 the magic number and/or the file type suffix of the file 14, and reads the entropy value of the file 14 if already calculated and stored, or calculates the entropy value of the file 14 if not already calculated and stored and, optionally but preferably, stores the calculated entropy value of the file 14 if that value was not previously determined and stored.

The workstation 18N then monitors 435 for a predetermined event, such as a write request to the server 12 for that file by the workstation 18. If the predetermined event has not occurred, the workstation 18N continues monitoring 435 and may perform other operations as well.

As mentioned above, if a write operation for that file 14 is requested, the server 12 may optionally perform 337 the requested write operation. Also as mentioned above, it is preferable, however, that the write operation not be performed at this point because, if the workstation 18 has been infected with ransomware, then performing the write operation at this point may overwrite the existing file with an encrypted file.

The workstation 18N determines 440 whether the magic number is incorrect or missing, as described with respect to operation 340 above.

If the magic number is incorrect or missing the workstation 18N may send a request, authorization, or instruction to the server 12 to perform the specified action(s) mentioned in operation 240 above. The workstation 18N may perform other operations as well. In an alternative embodiment, operation 440 is not performed. In another alternative embodiment, an operation, such as operation 440, may be performed immediately after operation 425 so that an encrypted file 14 is detected after a read operation and even without, or before, a later write operation.

As mentioned, some "smart" ransomware may take steps to recognize and not change the magic number. If the magic number is not incorrect the workstation 18N determines and stores 445 a new entropy value for the file, that is, the entropy value for the modified version of the file. The workstation 18N may store the entropy value for the file 14 on the server 12, but preferably stores the entropy values for the files 14 locally or on a device other than the server 12, such as on another workstation 18 or on another server (not shown).

The workstation 18N then determines 455 whether the new entropy value represents a substantial change from the previous entropy value. If the entropy value has substantially changed the workstation 18N may send 450 a request, authorization, or instruction to the server 12 to perform the specified action(s) mentioned in operation 240 above. The workstation 18N may perform other operations as well.

If the magic number is not incorrect, and there has not been a substantial change in the entropy value, the workstation 18N returns 465 to operation 415. The workstation 18N may perform other operations as well, such as sending a request, authorization, or instruction to the server 12 to perform the write action mentioned in operation 360 above. The operations 410-465 are preferably performed each time there is a request for a file to be read or written.

The operations of FIGS. 3A-B and 4A-B may also be viewed as scanning 315, 320, 325, 415, 425 a cached block of memory in response to occurrence of a first event and calculating a first entropy value for the cached block, scanning 340, 345, 440, 445 the cached block in response to occurrence of a second event and calculating a second entropy value for the cached block, and taking 350, 450 an action in response to determining 355, 455 that the second entropy value differs from the first entropy value by more than a predetermined amount, the action being at least one of: marking the cached block as read-only, marking the cached block as encrypted, or sending an alert that encryption software may be present. The first event may be creation of a file in the cached block or writing to a file in the cached block, and the second event may be writing to the file subsequent to the first event. Alternatively, the first event may be a first time, and the second event may be a second time later than the first time.

If the cached block comprises a file, the server 12 or workstation 18N determines 325, 425 the file type of the file, and takes the action in response to determining that the second entropy value is not within a predetermined range of entropy values for the file type.

If the memory comprises a plurality of cached blocks, the server 12 or workstation 18N maintains a record of cached blocks which have been marked as encrypted, and in response to determining that a number of cached blocks which have been marked as encrypted exceeds a predetermined number, marks all cached blocks as encrypted, and sends the alert.

Figure 5:
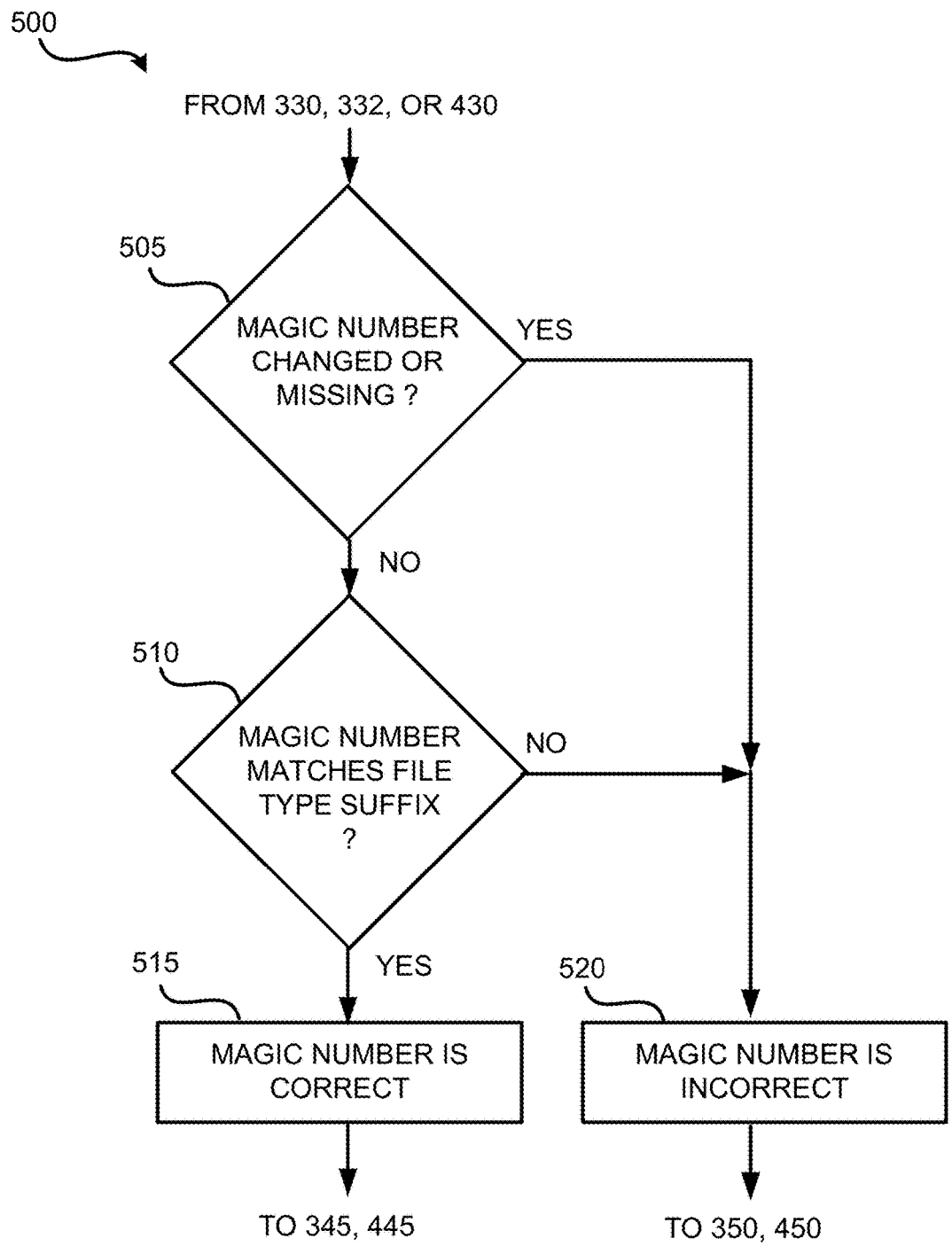
FIG. 5 is a flowchart of an exemplary procedure illustrating detection of an incorrect magic number.

FIG. 5 is a flowchart of an exemplary procedure 500 illustrating detection of an incorrect or missing magic number. Procedure 500 illustrates the process of operation 340 performed by server 12 or operation 440 performed by workstation 18N. From operation 335, 337, or 435, the server 12 (or workstation 18N) determines 505 whether the magic number is missing, or has been changed by, for example, comparing the magic number of the original file 14 with the magic number of the modified file to be written to the server 12.

If the magic number is missing or has been changed there is a high likelihood that the file has been encrypted so the server 12 (or workstation 18N) indicates 520 that the magic number for that file 14 is incorrect, such as by writing a file or modifying a file. The server 12 (or workstation 18N) then proceeds to operation 350 or 450.

If the magic number is present but has not been changed then the server 12 (or workstation 18N) determines 510 whether the magic number matches the file type suffix. If the magic number and the file type suffix do not match there is a high likelihood that the file has been encrypted so the server 12 (or workstation 18N) proceeds to operation 350 or 450.

If the magic number and the file type suffix do match, the server 12 (or workstation 18N) indicates 515 that the magic number is correct, such as by writing a bit to a file or changing a bit in a file. The server 12 (or workstation 18N) then proceeds to operation 345 or 445.

Figure 6:
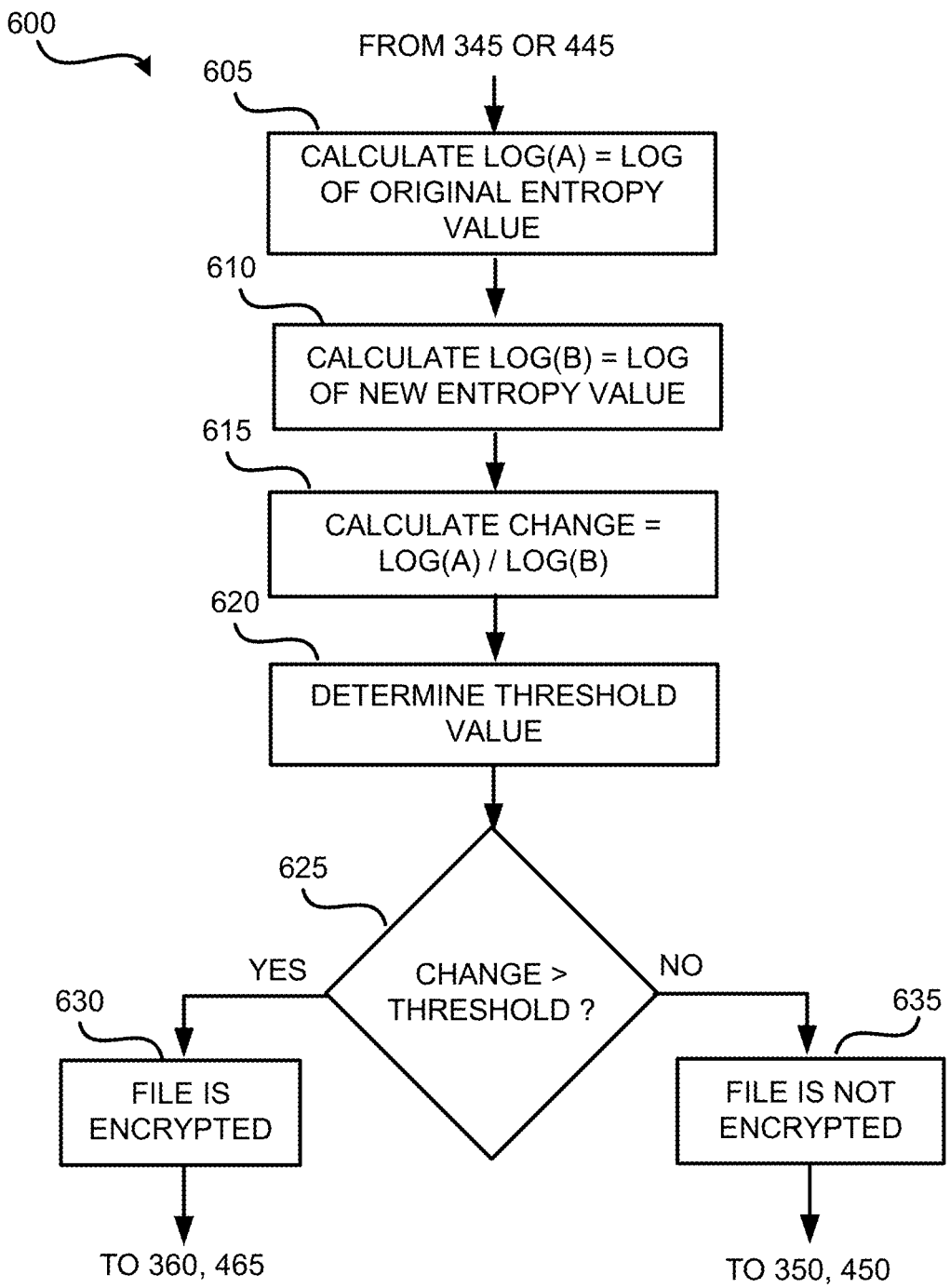
FIG. 6 is a flowchart of an exemplary procedure illustrating detection of a substantial change in entropy value.

FIG. 6 is a flowchart of an exemplary procedure 600 illustrating detection of a substantial change in the entropy value. Procedure 600 illustrates the process of operation 355 performed by server 12 and operation 455 performed by workstation 18N. From operation 345 or 445, the server 12 (or workstation 18N) calculates 605 LOG(A), the log of the original entropy value of the file 14, calculates 610 LOG(B), the log of the entropy value of the modified file 14, and calculates 615 the CHANGE=LOG(B)/LOG(A).

The server 12 (or workstation 18N) then determines 620 the threshold value to be used. The threshold value may be fixed, or user-selectable, or based at least in part on the file type. If the threshold value is fixed, or has been user-selected, it may be read from a storage location on the server 12, the workstation 18N, or some other desired location. The threshold value may be, for example, based, at least in part, on the file type of the file 14, which may be the information obtained in operation 325 or 425. The server 12 (or workstation 18N) uses the file type of the file 14 to access a table and determine an appropriate threshold value based at least in part on the file type.

The server 12 (or workstation 18N) then determines 625 whether the change is greater than the threshold value. If the change is greater than the threshold value then the file has likely been encrypted, such as by a ransomware operation, and the server 12 (or workstation 18N) indicates 630 that the file is likely encrypted, such as by setting a bit in a file. The server 12 (or workstation 18N) then proceeds to operation 360 or 465.

If the change is not greater than the threshold value then the file has likely not been encrypted by a ransomware operation, and the server 12 (or workstation 18N) indicates 635 that the file is likely not encrypted, such as by clearing a bit in a file. The server 12 (or workstation 18N) then proceeds to operation 350 or 450.

As an example, assume that the original entropy value of a file is 0.999, and the modified file entropy value is 0.9999. LOG(A) is −0.000,434,511,774, and LOG(B) is −0.000,043, 431,619,8. Therefore, LOG(A)/LOG(B) is 10.004,503,078, 653,31. If the threshold value is, for example, 10 or greater, then the threshold value has been exceeded so there is a likelihood that the modified file is an encrypted ransomware file. If the LOG(A)/LOG(B) change was, however, only 8 or 9, then the threshold value has not been exceeded so there is a likelihood that the modified file is not an encrypted ransomware file.

Other threshold values may be used if desired. If the threshold value is lower more files will be labeled as possibly being encrypted by ransomware, thus possibly adversely affecting the operation of the server 12. Conversely, if the threshold value is higher fewer files will be labeled as possibly being encrypted by ransomware, thus possibly missing detection of operation of ransomware at an early stage. As mentioned above, the threshold value may be, for example, determined at least in part by the file type. Other methods of comparison, other than logarithms, may be used. For example, the comparison may be a percentage of change of the entropy value.

Table I below illustrates exemplary entropy values and changes for a random selection of files of different types. It will be seen from Table I that the percent change in entropy from a normal file to an encrypted file may range from approximately 0% to approximately 447%, and the ratio of the log of the entropy of an encrypted file to the log of the entropy of a normal file may range from approximately 0.9 to over 130,000.

For example, the Adobe™ InDesign documents in Table I may have entropy values for a normal file ranging from 0.398610006 to 0.872210866, and entropy values for an encrypted file ranging from 0.999894621 to 0.999979424. Table I also shows entropy value changes for these documents from a normal file to an encrypted file ranging from 14.65% to 150.85%, and entropy log ratios ranging from 8727 to 33930. Thus, setting the change threshold value at 14% or the entropy ratio threshold value at 8725 would detect the change from a normal file to an encrypted file.

The range of normal entropy values for the Adobe™ InDesign documents in Table I for normal file operations is 0.398610006 to 0.872210866, which represents a change of 218%. Thus, a normal, valid operation on a file might change the entropy by up to 218%, which encompasses the range of 14.65% to 150.85% for entropy value changes from a normal file to an encrypted file. Setting the change threshold value at 14% could incorrectly designate a normal file as having been encrypted. Conversely, setting the change threshold value above 218% could result in no file being designated as encrypted.

The ratio of the normal logarithm divided by the encrypted logarithm for the Adobe™ InDesign documents in Table I for encrypted files ranges from 8727 to 33920. This range is higher than the log of the range of normal entropy values of LOG(0.39861006)/LOG(0.872210866), which is 6.727212. Thus, if the entropy ratio threshold value is 6 or lower the file would not be improperly designated as having been encrypted when only normal operations have been performed. Also, if the entropy ratio threshold value is 7 or higher all the Adobe InDesign files in this example would properly be designated as having been encrypted. Thus, from Table I below, a threshold greater than 7 would be appropriate to detect encryption of Adobe InDesign documents. Empirical studies may suggest modifications to that threshold value.

Consider now the Microsoft™ Word 2007+ documents in Table I, which have entropy values for normal files ranging from 0.873234361 to 0.993048212, and entropy values for encrypted files ranging from 0.997876217 to 0.999831802. The narrower range of entropy values is due at least in part to file compression operations performed by that program. Table I also shows entropy value changes from a normal file to an encrypted file ranging from 0.68% to 14.28%, and entropy log ratios ranging from approximately 33 to approximately 229.

For those Microsoft Word 2007+ documents, the logarithms of the entropy values for the normal files range from −0.058869183 to −0.003029666, the logarithms of the entropy values for the encrypted files ranges from −0.000923328 to −7.30536E-05, and the ratio of the logarithms ranges from 33.99063868 to 229.2975467. Thus, setting the change threshold value at 0.6% or the entropy ratio threshold value to be greater than 33 would detect the change from a normal file to an encrypted file.

Note, however, that the range of normal entropy values for Microsoft Word 2007+ documents for normal files is 0.873234361 to 0.993048212, which represents a change 0.119813851. Thus, a normal, valid operation on a file might change the entropy by up to approximately 13.72%, which encompasses the range of up to 14.28% for entropy value changes from a normal file being changed to an encrypted file. In that case, setting the change threshold value at 0.6% to capture all the encrypted files could incorrectly designate a normal file as having been encrypted. Conversely, setting the change threshold value above about 14% to exclude normal files could result in a substantial number of files not being designated as encrypted.

The ratio of the normal logarithm divided by the encrypted logarithm for Microsoft Word 2007+ documents for encrypted files ranges from 33.99063868 to 229.2975467. Thus, if the entropy ratio threshold value is 33 or lower a file would not be improperly designated as having been encrypted when only normal operations have been performed. Also, if the entropy ratio threshold value is 34 or higher all the Microsoft Word 2007+ documents in this example would properly be designated as having been encrypted. Thus, from Table I below, a ratio greater than 34 would be appropriate to detect encryption of Microsoft Word 2007+ documents. Empirical studies may suggest modifications to the range for the entropy ratio threshold value.

Thus, an entropy change threshold value of 14.65% to 150.85%, or a threshold ratio range greater than 8727, would be appropriate to detect encryption of Adobe InDesign documents. Also, an entropy change threshold value of 0.68% to 14.28%, or a threshold ratio range greater than 33, would be appropriate to detect encryption of Microsoft Word 2007+ documents. Thus, setting a single entropy change threshold value for all documents, or a single threshold ratio range for all documents, could result in an unacceptable number of documents being incorrectly classified. Therefore, it is preferred, but not necessary, that the entropy change threshold value or the threshold ratio value be based at least in part on the file type.

| File Type | File Size (Bytes) | Entropy, Normal | Entropy, Encrypted | Change in Entropy | Percent Change | Log (Entropy, Normal) * | Log (Entropy, Encrypted) | Log (Entropy, Normal)/Log (Entropy, Encrypted) |
|---|---|---|---|---|---|---|---|---|
| Adobe InDesign Document | 208896 | 0.398610006 | 0.999894621 | 0.601284614841 7420 | 150.85% | -0.399451803 | -4.57679E-05 | 8727.775812 |
| Adobe InDesign Document | 1650688 | 0.872210866 | 0.999988352 | 0.127777486510 5870 | 14.65% | -0.059378507 | -5.05862E-06 | 11738.091 |
| Adobe InDesign Document | 1040384 | 0.767704807 | 0.999979424 | 0.232274616770 4790 | 30.26% | -0.11480574 | -8.9362E-06 | 12847.26885 |
| Adobe InDesign Document | 1245184 | 0.74961658 | 0.999981883 | 0.250365302847 7260 | 33.40% | -0.125160816 | -7.86816E-06 | 15907.25519 |
| Adobe InDesign Document | 1679360 | 0.645646347 | 0.999987106 | 0.354340758892 3580 | 54.88% | -0.190005302 | -5.59984E-06 | 33930.49956 |
| Adobe Photoshop Image, 1112 x 384, grayscale 3x 8-bit channels | 124817 | 0.744564788 | 0.999849173 | 0.255284385403 2200 | 34.29% | -0.128097506 | -6.55081E-05 | 1955.446463 |
| ASCII text | 57 | 0.53868009 | 0.757811505 | 0.221113141458 70200 | 41.20% | -0.270284516 | -0.12043806 | 2.244164696 |
| Adobe InDesign Document | 208896 | 0.398610006 | 0.999894621 | 0.601284614841 7420 | 150.85% | -0.399451803 | -4.57679E-05 | 8727.775812 |
| Adobe InDesign Document | 1650688 | 0.872210866 | 0.999988352 | 0.127777486510 5870 | 14.65% | -0.059378507 | -5.05862E-06 | 11738.091 |
| Adobe InDesign Document | 1040384 | 0.767704807 | 0.999979424 | 0.232274616770 4790 | 30.26% | -0.11480574 | -8.9362E-06 | 12847.26885 |
| Adobe InDesign Document | 1245184 | 0.74961658 | 0.999981883 | 0.250365302847 7260 | 33.40% | -0.125160816 | -7.86816E-06 | 15907.25519 |
| Adobe InDesign Document | 1679360 | 0.645646347 | 0.999987106 | 0.354340758892 3580 | 54.88% | -0.190005302 | -5.59984E-06 | 33930.49956 |
| Adobe Photoshop Image, 1112 x 384, grayscale, 3x 8-bit channels | 124817 | 0.744564788 | 0.999849173 | 0.255284385403 2200 | 34.29% | -0.128097506 | -6.55081E-05 | 1955.446463 |
| ASCII text | 57 | 0.53868009 | 0.757811505 | 0.221113141458 70200 | 41.20% | -0.270284516 | -0.12043806 | 2.244164696 |
| ASCII text | 528 | 0.393950475 | 0.953867194 | 0.559916719095 3170 | 142.13% | -0.404558371 | -0.020512087 | 19.72292555 |
| ASCII text | 4046 | 0.612149033 | 0.994603944 | 0.382459114864 80 | 62.48% | -0.213142832 | -0.00234982 3 | 90.70591677 |
| ASCII text, with CRLF line terminators | 88 | 0.580289289 | 0.79258824 | 0.212298950641 4370 | 36.59% | -0.236355445 | -0.100952376 | 2.341256889 |

-continued

| File Type | File Size (Bytes) | Entropy, Normal | Entropy, Encrypted | Change in Entropy | Percent Change | Log (Entropy, Normal) * | Log (Entropy, Encrypted) | Log (Entropy, Normal)/Log (Entropy, Encrypted) |
|---|---|---|---|---|---|---|---|---|
| ASCII text, with CRLF line terminators | 125 | 0.531627533 | 0.83675337 | 0.305125836179648 | 57.39% | −0.274392535 | −0.07740253 | 3.545007307 |
| ASCII text, with CRLF line terminators | 229 | 0.585593847 | 0.903779956 | 0.318186108423319 | 54.34% | −0.232403495 | −0.043937295 | 5.289435679 |
| Berkeley DB (Btree, version 9, native byte-order) | 49152 | 0.768871082 | 0.994471755 | 0.230600673065722 | 29.99% | −0.114146473 | −0.000229475 | 497.4251778 |
| Berkeley DB(Btree, version 9, native byte-order) | 53248 | 0.788036256 | 0.999535964 | 0.211499707564629 | 26.84% | −0.103453801 | −0.000201575 | 513.2270197 |
| Berkeley DB(Btree, version 9, native byte-order) | 49152 | 0.769805583 | 0.99950212 | 0.229696536223574 | 29.84% | −0.113618943 | −0.000216281 | 525.3136653 |
| Berkeley DB (Btree, version 9, native byte-order) | 65536 | 0.721552121 | 0.999646467 | 0.27809434672698 | 38.54% | −0.141732293 | −0.000153564 | 922.9504279 |
| data | 524288000 | 0.999999956 | 0.999999951 | (0.000000004749462) | 0.00% | −1.90207E-08 | −2.10834E-08 | 0.902166267 |
| data | 524288000 | 0.999999955 | 0.999999953 | (0.0000000015449720) | 0.00% | −1.96542E-08 | −2.03252E-08 | 0.966988166 |
| DOS EPS Binary File Postscript starts at byte 32 length 275877 TIFF starts at byte 275909 length 50685 | 326594 | 0.732689933 | 0.999928276 | 0.267238343339517 | 36.47% | −0.135079776 | −3.11504E-05 | 4336.378152 |
| HTML document, ASCII text | 880 | 0.614304276 | 0.973503246 | 0.359198692136890 | 58.47% | −0.211616461 | −0.011662596 | 18.14448452 |
| JPEG image data, Ex if standard | 1191652 | 0.994173632 | 0.999982513 | 0.005808880686693 | 0.58% | −0.002537759 | −7.59454E-06 | 334.15579 |
| JPEG image data, Ex if standard | 477588 | 0.981378317 | 0.999950915 | 0.018572598103673 | 1.89% | −0.008163542 | −2.1318E-05 | 382.9405914 |

-continued

| File Type | File Size (Bytes) | Entropy, Normal | Entropy, Encrypted | Change in Entropy | Percent Change | Log (Entropy, Normal) * | Log (Entropy, Encrypted) | Log (Entropy, Normal)/Log (Entropy, Encrypted) |
|---|---|---|---|---|---|---|---|---|
| Keepass password database 2.x KDBX | 1472942 | 0.999984274 | 0.999983918 | (0.000000355510500) | 0.00% | −6.82993E-06 | −6.98444E-06 | 0.977887936 |
| Microsoft Excel 2007+ | 14555 | 0.915303789 | 0.99851262 | 0.083208830999991450 | 9.09% | −0.03843474 | −0.000646442 | 59.45583378 |
| Microsoft Excel 2007+ | 17226 | 0.930136884 | 0.998865194 | 0.068728309285050 | 7.39% | −0.031453133 | −0.00049312 | 63.7834298 |
| Microsoft Excel 2007+ | 11100 | 0.867922414 | 0.998088847 | 0.130166433103423 | 15.00% | −0.061519096 | −0.000830797 | 74.04826052 |
| Microsoft OOXML | 25134 | 0.951092821 | 0.999158434 | 0.048065613744796 | 5.05% | −0.021777097 | −0.000365641 | 59.55864849 |
| Microsoft Outlook email folder (>=2003) | 4334592 | 0.614904381 | 0.999994159 | 0.385089777610006 | 62.63% | −0.211192413 | −2.53676E-06 | 83252.86034 |
| Microsoft Outlook email folder (>=2003) | 2302976 | 0.278606625 | 0.999990176 | 0.721383551324001 | 258.93% | −0.555008561 | −4.2665E-06 | 130085.1461 |
| Microsoft Visio | 88576 | 0.790936411 | 0.999739661 | 0.208803250375186 | 26.40% | −0.101858431 | −0.000113078 | 900.7777136 |
| Microsoft Word 10.0 | 24576 | 0.182538826 | 0.999000085 | 0.816461258570144 | 447.28% | −0.738644746 | −0.000434475 | 1700.086182 |
| Microsoft Word 11.3 | 40960 | 0.321297279 | 0.999359547 | 0.678062276948869 | 211.04% | −0.493092965 | −0.000278234 | 1772.22167 |
| Microsoft Word 11.3.8 | 39424 | 0.355891216 | 0.99940939 | 0.640518173518717 | 178.47% | −0.445037171 | −0.000256575 | 1734.533733 |
| Microsoft Word 2007+ | 114126 | 0.993048212 | 0.999794786 | 0.006746574241501 | 0.68% | −0.003029666 | −8.91324E-05 | 33.99063868 |
| Microsoft Word 2007+ | 16708 | 0.927421003 | 0.998526095 | 0.071105092135540 | 7.67% | −0.032723073 | −0.000640581 | 51.08342691 |
| Microsoft Word 2007+ | 14406 | 0.91150141 | 0.998296031 | 0.086794620809009 | 9.52% | −0.040242655 | −0.000740656 | 54.33381976 |
| Microsoft Word 2007+ | 21436 | 0.939199805 | 0.998862117 | 0.059662311756772 | 6.35% | −0.027242006 | −0.000494458 | 55.09470193 |
| Microsoft Word 2007+ | 12651 | 0.898856873 | 0.998134995 | 0.099278128416020 | 11.04% | −0.046309457 | −0.000810718 | 57.12155281 |
| Microsoft Word 2007+ | 21384 | 0.938493887 | 0.998909348 | 0.060415461053544 | 6.44% | −0.027568552 | −0.000473923 | 58.17100602 |
| Microsoft Word 2007+ | 13368 | 0.903078942 | 0.998277716 | 0.095198773879740 | 10.54% | −0.044274284 | −0.000748623 | 59.14095102 |
| Microsoft Word 2007+ | 12611 | 0.898419443 | 0.998194226 | 0.099774783490046 | 11.11% | −0.046520858 | −0.000784946 | 59.26628101 |
| Microsoft Word 2007+ | 11223 | 0.880636385 | 0.997876217 | 0.117239832199057 | 13.31% | −0.055203375 | −0.000923328 | 59.78738553 |
| Microsoft Word 2007+ | 21606 | 0.939903557 | 0.999012199 | 0.059108642269883 | 6.29% | −0.026916707 | −0.000429209 | 62.71241406 |
| Microsoft Word 2007+ | 130904 | 0.962251213 | 0.999831802 | 0.037580589097244 | 3.91% | −0.016711533 | −7.30536E-05 | 228.7570382 |
| Microsoft Word 2007+ | 58738 | 0.935369837 | 0.99970866 | 0.064338823074176 | 6.88% | −0.029016639 | −0.000126546 | 229.2975467 |

-continued

| File Type | File Size (Bytes) | Entropy, Normal | Entropy, Encrypted | Change in Entropy | Percent Change | Log (Entropy, Normal) * | Log (Entropy, Encrypted) | Log (Entropy, Normal)/Log (Entropy, Encrypted) |
|---|---|---|---|---|---|---|---|---|
| MS Windows icon resource -1 icon, 16 × 16 | 1406 | 0.687457903 | 0.984555598 | 0.297097695609312O | 43.22% | -0.162753891 | -0.006759754 | 24.07689544 |
| PDF document, version 1.3 | 2835197 | 0.983752625 | 0.999991834 | 0.016239208776693O | 1.65% | -0.007114096 | -3.54656E-06 | 2005.91645 |
| PDF document, version 1.4 | 77556 | 0.993564587 | 0.999683634 | 0.00611904682848³O | 0.62% | -0.002803896 | -0.000137418 | 20.40418997 |
| PDF document, version 1.4 | 100655 | 0.964998298 | 0.999767004 | 0.034768705912643⁹ | 3.60% | -0.015473452 | -0.000101201 | 152.8989276 |
| PDF document, version 1.4 | 2015690 | 0.927241204 | 0.999990291 | 0.072749086653931O | 7.85% | -0.032807278 | -4.21653E-06 | 7780.627935 |
| PDF document, version 1.5 | 173775 | 0.935945483 | 0.999859358 | 0.06391387516819⁹O | 6.83% | -0.028749447 | -6.10842E-05 | 470.6528735 |
| PDF document, version 1.6 | 2537818 | 0.999936288 | 0.999991561 | 0.000055273423433O | 0.01% | -2.76708E-05 | -3.66503E-06 | 7.549967304 |
| PDFdocument, version 1.6 | 246288 | 0.998055651 | 0.999902521 | 0.001846869424627O | 0.19% | -0.000845242 | -4.23367E-05 | 19.96475091 |
| PDF document, version 1.6 | 18630 | 0.925554009 | 0.998873692 | 0.073319683465825O | 7.92% | -0.033598234 | -0.000489425 | 68.64839714 |
| PDF document, version 1.6 | 465578 | 0.98983237 | 0.999947252 | 0.010114881706784¹ | 1.02% | -0.00443834 | -2.29088E-05 | 193.7400479 |
| PDFdocument, version 1.6 | 391269 | 0.951863338 | 0.999937189 | 0.048073851207633O | 5.05% | -0.0214254 | -2.72793E-05 | 785.4079682 |
| PDF document, version 1.6 | 5432514 | 0.981623715 | 0.999995473 | 0.018371758098352O | 1.87% | -0.00805495 | -1.96586E-06 | 4097.415279 |
| PE32 executable (GUI) Intel 80386, for MS Windows | 8729896 | 0.999508296 | 0.999997178 | 0.000488882221349 | 0.05% | -0.000213597 | -1.22563E-06 | 174.2756725 |

-continued

| File Type | File Size (Bytes) | Entropy, Normal | Entropy, Encrypted | Change in Entropy | Percent Change | Log (Entropy, Normal) * | Log (Entropy, Encrypted) | Log (Entropy, Normal)/Log (Entropy, Encrypted) |
|---|---|---|---|---|---|---|---|---|
| PNG image data, 1112 × 384, 8-bit gray + alpha, noninterlaced | 21122 | 0.992586808 | 0.998920454 | 0.006333646486640 | 0.64% | −0.003231501 | −0.000469094 | 6.88881195 |
| PNG image data, 12528 × 8352, 8-bit/color RGB, noninterlaced | 7023975 | 0.993116322 | 0.999996895 | 0.006880572749860 0 | 0.69% | −0.00299988 | −1.34857E−06 | 2224.497434 |
| PNG image data, 154 × 50, 8-bit/color RGBA, noninterlaced | 5406 | 0.992761702 | 0.995666259 | 0.002904556074977 0 | 0.29% | −0.003154985 | −0.00188621 | 1.672658204 |
| PNG image data, 16 × 16, 8-bit/color RGBA, noninterlaced | 3094 | 0.98523509 | 0.993548495 | 0.008313405403745 0 | 0.84% | −0.006460129 | −0.00281093 | 2.298217595 |
| PNG image data, 32 × 32, 8-bit/color RGBA, noninterlaced | 3287 | 0.986421939 | 0.99228843 | 0.005866649042292 40 | 0.59% | −0.005937277 | −0.003362073 | 1.765957407 |
| PNG image data, 673 × 200, 8-bit/color RGBA, noninterlaced | 27224 | 0.996293485 | 0.999135526 | 0.00284204 11374660 | 0.29% | −0.00161271 | −0.000375599 | 4.293705969 |
| vCalendar calendar file | 4032 | 0.725309119 | 0.994995039 | 0.269685919562153 0 | 37.18% | −0.139476862 | −0.002179085 | 64.00708241 |
| Zip archive data, at least v1.0 to extract | 919212 | 0.999711888 | 0.999976071 | 0.000264182331118 0 | 0.03% | −0.000125143 | −1.03925E−05 | 12.04173456 |
| Zip archive data, at least v1.0 to extract | 990407 | 0.999599876 | 0.999978991 | 0.000379114977210 0 | 0.04% | −0.000173806 | −9.12414E−06 | 19.04906338 |
| Zip archive data, at least v2.0 to extract | 20638 | 0.995527249 | 0.998807724 | 0.00328047 | 0.33% | −0.001946848 | −0.000518108 | 3.757610855 |
| Zip archive data, at least v2.0 to extract | 564396 | 0.999544943 | 0.999961674 | 0.000416731102212 0 | 0.04% | −0.000197674 | −1.6645E−05 | 11.87587781 |

NOTE:
E-xx = 10^(−xx)

Figure 7:
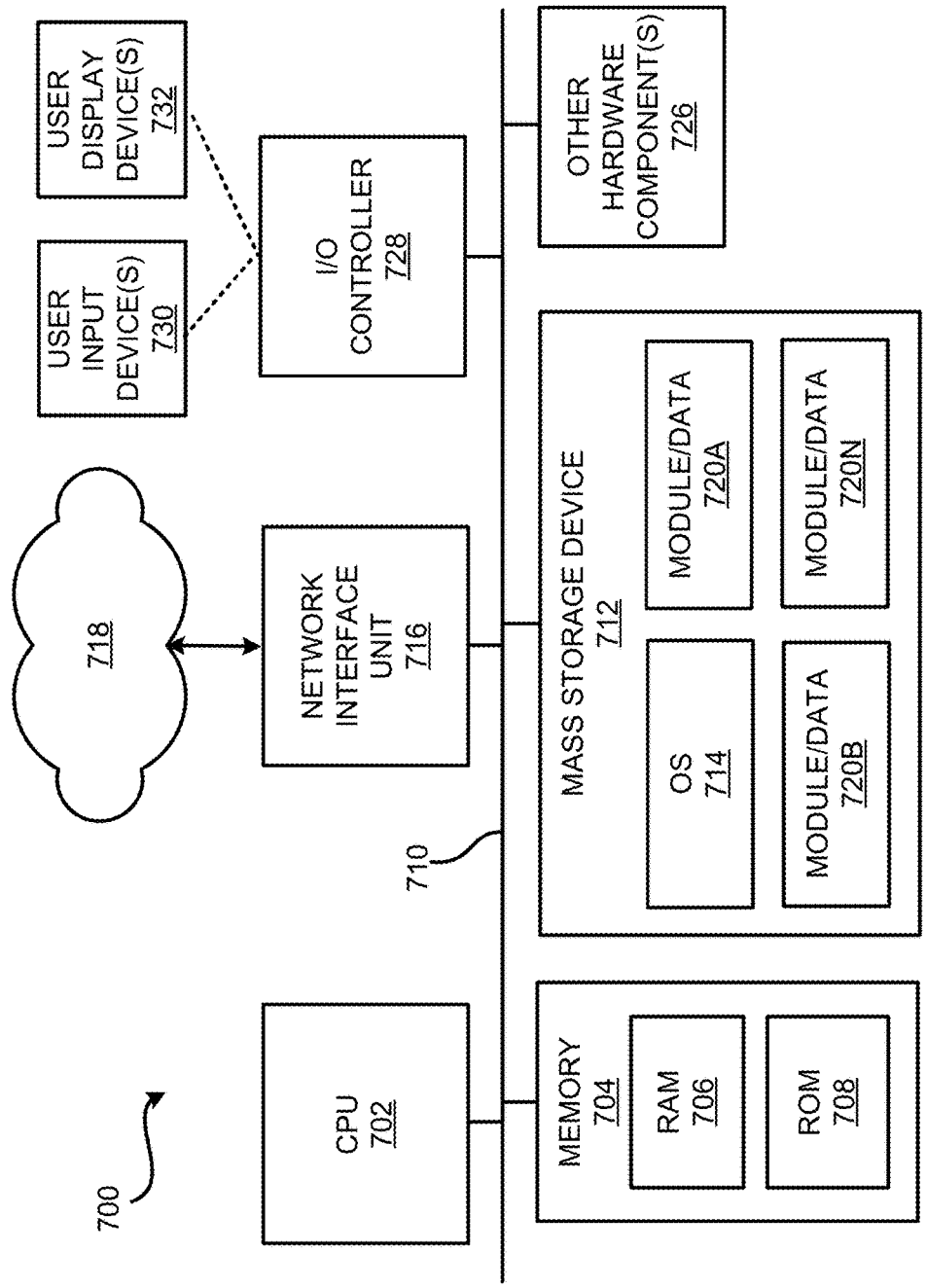
FIG. 7 illustrates exemplary architecture for a computer 700 for computing devices capable of performing as described herein.

FIG. 7 illustrates exemplary architecture for a computer 700 for computing devices capable of performing as described herein. Thus, the architecture is exemplary for a server computer, workstation, mobile phone, a personal digital assistant (PDA), a smart phone, a desktop computer, a netbook computer, a tablet computer, a laptop computer, a network appliance, hand-held computer, embedded computer, or other computing device. The computer 700 may be utilized to execute any aspects of the software operations presented herein.

The exemplary computer 700 includes one or more central processing units 702 ("CPU"), a system memory 704, including a random access memory 706 ("RAM") and a read-only memory ("ROM") 708, and a system bus 710 that couples the memory 704 to the CPU 702. The computer 700 may include a baseboard, or "motherboard," which is a printed circuit board to which a multitude of components or devices may be connected by way of the system bus 710, or other electrical communication paths. A basic input/output system containing the basic routines that help to transfer information between elements within the computer 700, such as during startup, is stored in the ROM 708. The computer 700 includes one or more mass storage devices 712 for storing the operating system 714, one or more programs or modules 720A-720N, and data, as described herein. The mass storage device 712 is connected to the CPU 702 through the bus 710. The mass storage device 712 and its associated computer-readable storage media provide nonvolatile storage for the computer 700.

According to one embodiment, the operating system includes a member of the LINUX family of operating systems. According to another embodiment, the operating system includes a member of the WINDOWS® family of operating systems from MICROSOFT Corporation in Redmond, Wash. According to further embodiments, the operating system may include a member of the UNIX or SOLARIS families of operating systems. It should be appreciated that other operating systems may also be utilized. The mass storage device 712 may store other system or application programs, modules, and/or data utilized by the computer 700, such as the modules/data 720A-20N, that enables or facilitates performance of a process or execution of an algorithm for the functions and results described herein.

The memory 704 and mass storage device 712 are preferably separate components, but the memory 704 could be included in the mass storage device 712. The memory 704 and the mass storage device 712 may be collectively considered to be a memory device, and may collectively be referred to as such.

The mass storage device 712 and RAM 706 may store one or more program modules and/or data, such as program modules and/or data 720A-720N. The computer 700 may also have access to other computer-readable storage media to store and retrieve information, such as program modules, data, data structures, or other information.

The computer 700 may operate in a networked environment using logical connections to remote computers and/or servers through a network such as the network 718. The computer 700 may connect to the network 718 through a network interface unit 716 connected to the bus 710. The network interface unit 716, such as a network interface controller ("NIC"), such as a gigabit Ethernet adapter, is capable of connecting the computer 700 to other computing devices over the network 718. Multiple NICs 716 may be present in the computer 700, connecting the computer to multiple communication channels, such as but not limited to communication channels in the network 718, other types of networks, and to remote computer systems.

The computer 700 also may include an input/output (I/O) controller 728 for receiving and processing input from one or more user input devices 730 such as, but not limited to, a keyboard, mouse, touchscreen, touchpad, keypad, or electronic stylus. Similarly, the input/output controller 728 may provide output to one or more user display devices 732 such as, but not limited to, a display screen, a printer, a computer monitor, a flat-panel display, a digital projector, a plotter, or other type of output device. A user input device 730 and a user output device 732 may be embodied in the same component, such as a touch-sensitive screen. The user input device 730 and the user output device 732 may be integral with a device, such as in the case of a handheld device, or may be separate components, such as a keyboard, mouse and display used with many desktop systems.

Other hardware components 726 may also be present. For example, a sensor component, such as a magnetometer, an ambient light sensor, a proximity sensor, an accelerometer, a gyroscope, a global positioning system (GPS) sensor, a microphone, other audio input device, a camera, etc., may be present.

It is also contemplated that the architecture of the computer may include other components that are not explicitly shown herein, may utilize an architecture completely different than that shown herein, and/or may not include all of the components shown herein, for example, components not directed to facilitating or performing the functions and results described herein.

The mass storage device 712 may consist of one or more physical storage units. The physical storage units may interface through, for example, a serial attached SCSI ("SAS") interface, a serial advanced technology attachment ("SATA") interface, a fiber channel ("FC") interface, or other type of interface for physically connecting and transferring data. The computer 700 may store data on the mass storage device 712 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 712 is characterized as primary or secondary storage and the like.

For example, the computer 700 may store information to the mass storage device 712 by issuing instructions to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible and contemplated, with the foregoing examples provided only to facilitate this description. The computer 700 may further read information from the mass storage device 712 by detecting the physical states or characteristics of one or more particular locations within the physical storage units.

The CPU 702 is a programmable processor that performs arithmetic and logical operations for the operation of the computer 700. A CPU 702 performs operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

Computer program code for carrying out operations described herein, including for example, communication, data collection, data processing and publishing, may be written in an object oriented programming language such as Java, Smalltalk or C++. The computer program code for carrying out the operations disclosed herein may be written in conventional procedural programming languages, such as the "C" programming language or in a visually oriented programming environment, such as VisualBasic. Use of another programming language is also possible and contemplated.

Certain of the program code may execute entirely on one computer, such as a local computer, partly on the computer, as a stand-alone software package, partly on the local computer and partly on another computer, such as a remote computer, or entirely on the other computer. In the latter scenario, the other computer may be connected to the local computer through a local area network (LAN) or a wide area network (WAN), or the connection may be made to an external computer (for example, through the Internet using an Internet service provider). Some program code may execute on a computer configured as a "gateway" computer, and some program code can execute on a server with communication between the gateway computer(s) and a server computer using the Internet.

Reference may be made herein to flowchart illustrations and/or block diagrams of methods, systems, computer program products, data, and/or system architecture structures. It will be understood that a block, or blocks, of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions and/or acts specified in the block or blocks.

These computer program instructions may be stored in a computer-readable memory or storage that can direct a computer or other programmable data processing apparatus to function in a particular manner, such that the instructions stored in the computer-readable memory or storage are part of an article of manufacture.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the block or blocks.

The software components described herein, when loaded from the mass storage device 712 or other computer-readable storage media into the CPU 702 and executed, transform the CPU 702 and the overall computer 700 from a general-purpose computing system into a special-purpose computing system customized to facilitate or perform the functionality presented herein. The CPU 702 may be constructed from any number of transistors or other discrete circuit elements, which may individually or collectively assume any number of states. More specifically, the CPU 702 may operate as one or more finite-state machines, in response to executable instructions contained within the software modules 720A-20N. The CPU 702 may be a single processor, or may be a plurality of processors. These computer-executable instructions may transform the CPU 702 by specifying how the CPU 702 transitions between states, thereby transforming the transistors or other discrete hardware elements constituting the CPU 702.

By way of example, and not limitation, computer-readable storage media may include volatile and non-volatile, removable and non-removable, media implemented in any method or technology for storage of information such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 700. For purposes of the claims, the phrase "computer storage medium" and variations thereof, does not include waves, signals, and/or other transitory and/or intangible communication media, per se, and specifically excludes interpretations thereof which are prohibited by applicable statutory and case law.

Communications media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communications media includes wired media such as a wired network or direct-wired connection, and wireless media such as acoustic, RF, infrared and other wireless media. Combinations of the any of the above are also included within the scope of communications media.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, then stored in a computer memory.

The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Encoding the software instructions, logic, and/or modules presented herein may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion. Thus, in light of the above, many types of physical transformations take place in the computer in order to store and execute the software components presented herein.

The subject matter described herein may have been presented in the general context of program modules that execute in conjunction with the execution of an operating system and application programs on a computer system. Those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The operations of the procedures disclosed herein may not have been presented in any necessary order, and performance of some or all the operations in an alternative order(s) is possible and is contemplated. The operations have been presented in the demonstrated order for ease of description and illustration. Operations may be added, omitted, performed in a different order, and/or performed simultaneously, without departing from the scope of the appended claims. It also should be understood that one or more of the procedures disclosed herein may be ended at any time and need not be performed in their entirety.

The logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein may be variously referred to as states, operations, structural devices, acts, or modules. These states, operations, structural devices, acts, and modules may be implemented in software, in firmware, in special purpose digital logic, and in any desired combination thereof.

Specific exemplary embodiments have been described herein with reference to the accompanying drawings. These embodiments are provided so that this disclosure will be thorough and complete, but variations of these embodiments, and other embodiments, may also be used to obtain the desired operation and/or results. The terminology used in the detailed description of the particular exemplary embodiments and in the accompanying drawings is not intended to be limiting or suggest that there is no other embodiment which can achieve the desired operation and/or results. Rather, the terminology is used to instruct one of ordinary skill in the art how to make and use the various embodiments described herein. The embodiments disclosed herein may be implemented as a method, system, data processing system, or computer program product. Accordingly, an entirely software embodiment, or an embodiment combining software and hardware aspects is possible and contemplated. It should be appreciated that the subject matter described herein may be implemented as a computer-controlled apparatus, a computer process, a computing system, or as an article of manufacture such as a computer-readable storage medium.

The phrases "for example," and "such as," mean by way of example and not of limitation.

The singular forms "a," "an," and "the" are intended to include the plural forms as well, unless expressly stated otherwise.

The terms "includes," "comprises," "including," "comprising," and "having" specify the presence of stated features, integers, steps, operations, elements, and/or components, but do not preclude the presence or addition of one or more other features, integers, steps, operations, elements, components, and/or groups thereof.

When an element is referred to as being "connected" or "coupled" to another element, it can be directly connected or coupled, mechanically, hydraulically, electrically, electronically, wirelessly, etc., to the other element, or intervening elements may be present.

The term "and/or" includes any and all combinations of one or more of the associated listed items.

Phrases such as "between X and Y," "between about X and Y," "between X and about Y," and "between about X and about Y," should be interpreted to include X and Y unless otherwise specifically noted.

Terms such as "about", "approximately", and "substantially" are relative terms and indicate that a value or parameter may vary from any stated value but the desired result is still achieved, that is, that the apparatus or method still provides the indicated or desired result, or that the operation of a device or method is not adversely affected to the point where it cannot perform its intended purpose. As an example, and not as a limitation, if a battery voltage of approximately "V" volts is recited, a lower battery voltage is still about, approximately, or substantially "V" volts if the connected circuit can still perform its desired function. Similarly, a higher battery voltage is still about, approximately, or substantially "V" volts if the connected circuit is not destroyed and can still perform its desired function. As another example, and not as a limitation, if a height of approximately "X" inches is recited, a lower height, or a higher height, is still about, approximately, or substantially "X" inches if the desired function can still be performed or the desired result can still be achieved.

Unless otherwise defined, all terms (including technical and scientific terms) used herein have the same meaning as commonly understood by one of ordinary skill in the art or arts relevant to this specification. It will be further understood that terms, such as those defined in commonly used dictionaries, should be interpreted as having a meaning that is consistent with their meaning in the context of this specification and relevant art, and should not be interpreted in an idealized or overly formal sense unless expressly so defined herein. For brevity and/or clarity, well-known functions or constructions may not be described in detail herein.

While the terms vertical, horizontal, upper, lower, bottom, top and the like may be used herein, it is to be understood that these terms are used for ease in referencing the drawing and, unless otherwise indicated or required by context, does not denote a required orientation when installed, mounted, assembled, used, etc.

The different advantages/benefits discussed herein may be used individually or in combination with one, some or possibly even all the other advantages/benefits. Furthermore, not every implementation, nor every component of an implementation, is necessarily required to obtain, or necessarily required to provide, an advantage or a benefit, or two or more of the advantages or benefits. Furthermore, the claimed subject matter is not limited to implementations that solve any specific disadvantage or all the disadvantages noted in any part of this disclosure.

Conditional language, such as, among others, "can", "could", "might", or "may", unless specifically stated otherwise, or otherwise understood within the context as used, is generally intended to convey that certain embodiments preferably or optionally include certain features, elements and/or steps, while some other embodiments optionally may not include those certain features, elements and/or steps. Thus, such conditional language indicates, in general, that those features, elements and/or step may not be required for every implementation or embodiment.

Language specific to mechanical, electrical, operational, and computer structural features, methodological and transformative acts, specific computing machinery, and computer-readable storage media may have been used herein, but the appended claims are not necessarily limited to the specific features, hardware, acts, operations, or media described herein. Rather, the specific features, acts, and mediums are disclosed as example forms of implementing the claims.

The subject matter described herein is provided by way of illustration for the purposes of teaching, suggesting, and describing only, and should not be construed as limiting or restricting the scope of the claims. Combinations and alternatives to the illustrated embodiments are contemplated and described herein, and may be set forth in the claims. Various modifications and changes may be made to the subject matter described herein without strictly following the exemplary embodiments and applications illustrated and described, and still fall within the scope of the claims.

The invention claimed is:

1. A computer-implemented method to detect and act with respect to malware, comprising:
   for a plurality of stored files, calculating and storing respective first entropy values for individual files of the stored files;
   subsequent to the calculating and storing of the respective first entropy values, determining that a predetermined event has occurred with respect to a file of the plurality of stored files, the predetermined event being at least one of: occurrence of a predetermined date, occurrence of a predetermined time, elapse of a predetermined amount time since a last predetermined event occurred, creation of a new file, storage of a new file, modification of the file to produce a modified version of the file, a write operation, an instruction to write to the file to produce a modified version of the file, or a read operation;
   retrieving a first entropy value for the file;
   calculating a second entropy value, the second entropy value being for
     a current version of the file when the predetermined event is occurrence of a predetermined date, occurrence of a predetermined time, elapse of a predetermined amount time since a last predetermined event occurred, or a read operation;
     the modified version when the predetermined event is modification of the file, or an instruction to write to the file; or
     the new file when the predetermined event is creation of the new file, storage of the new file, or a write operation:
   comparing the second entropy value with the first entropy value;
   determining that the second entropy value is substantially different from the first entropy value; and
   performing, or causing another computer to perform, a predetermined action regarding the malware, wherein the predetermined action comprises at least one of: locking one or more files of the plurality of stored files, making one or more of the files of the plurality of stored files to be read-only, causing the modified version to be recorded as a new file or as a different version of the file, causing a copy of one or more files of the plurality of stored files to be sent to a backup server, postponing a scheduled destruction or erasure of a backup file, stopping any scheduled destruction or erasure of a backup file, marking the file or the modified version as encrypted, or marking a cached-block as encrypted.

2. The computer-implemented method of claim 1, wherein the predetermined event is receipt of an instruction to write to the file.

3. The computer-implemented method of claim 1, wherein determining that the second entropy value is substantially different from the first entropy value comprises:
   determining a percentage of change for the second entropy value with respect to the first entropy value; and
   determining that the percentage of change exceeds a percentage threshold value.

4. The computer-implemented method of claim 1, wherein determining that the second entropy value is substantially different from the first entropy value comprises:
   determining a first log of the first entropy value;
   determining a second log of the second entropy value;
   determining a ratio of the second log to the first log; and
   determining that the ratio exceeds a ratio threshold value.

5. The computer-implemented method of claim 1 wherein the file has a plurality of sections and calculating the first entropy value for the file comprises:
  calculating an entropy value for each section of the file; and
  calculating the first entropy value for the file as an average of entropy values for the sections of the file.

6. The computer-implemented method of claim 1 wherein the predetermined action comprises to lock one or more files of the plurality of files.

7. The computer-implemented method of claim 1 and further comprising:
  determining a file type for the file, wherein the file type is one of: ASCII text, an Adobe Photoshop image, an Adobe Illustrator image file, a Microsoft Outlook message, GIF image data, an HTML file, ISO MP4 media, a JPEG image data, a text file, a WordPerfect™ file, a Microsoft Excel file, a Microsoft PowerPoint™ file, a Microsoft Visio file, a word processing document, a spreadsheet, a drawing file, an image file, a 3D image file, a raster image file, a vector image file, a page layout file, a database file, an audio file, a video file, an executable file, a game file, a geographical information system file, a computer aided drawing file, a web file, a font file, a system file, a settings file, an encoded file, a compressed file, a disk image file, an application development file, a backup file, a javascript object notation file, an extensible markup language file, or an unstructured data file.

8. The computer-implemented method of claim 1 wherein the predetermined action comprises to make one or more of the files of the plurality of stored files to be read-only.

9. The computer-implemented method of claim 1 wherein the predetermined action comprises to cause the modified version to be recorded as a new file or as a different version of the file.

10. The computer-implemented method of claim 1 wherein the predetermined action comprises to cause a copy of one or more files of the plurality of stored files to be sent to a backup server.

11. The computer-implemented method of claim 1 wherein the predetermined action comprises to send an alert to one or more human operators.

12. The computer-implemented method of claim 1 wherein the predetermined action comprises at least one of:
  to postpone any scheduled destruction, or erasure of a backup tape or backup file; or
  to stop any scheduled destruction, or erasure of a backup tape or backup file.

13. The computer-implemented method of claim 1 and further comprising:
  determining a file type of the file;
  determining that the second entropy value is not within a predetermined range of entropy values for the file type; and
  wherein the predetermined action comprises marking the file as encrypted.

14. The computer-implemented method of claim 1, wherein the predetermined event is the modification of the file, and further comprising:
  determining a file type of the file;
  determining that the second entropy value is not within a predetermined range of entropy values for the file type; and
  marking the modified version of the file as encrypted.

15. A system to detect and act with respect to malware, comprising:
  one or more computing devices configured to:
    for a plurality of stored files, calculate and store respective first entropy values for individual files of the stored files;
    subsequent to the calculate and store of the respective first entropy values, determine that a predetermined event has occurred with respect to a file of the plurality of stored files, the predetermined event being at least one of: occurrence of a predetermined date, occurrence of a predetermined time, elapse of a predetermined amount time since a last predetermined event occurred, creation of a new file, storage of a new file, modification of the file to produce a modified version of the file, a write operation, an instruction to write to the file to produce a modified version of the file, or a read operation;
    retrieve a first entropy value for the file;
    calculate a second entropy value, the second entropy value being for:
      a current version of the file when the predetermined event is occurrence of a predetermined date, occurrence of a predetermined time, elapse of a predetermined amount time since a last predetermined event occurred, or a read operation;
      the modified version when the predetermined event is modification of the file or an instruction to write to the file; or
      the new file when the predetermined event is creation of the new file, storage of the new file, or a write operation;
    compare the second entropy value with the first entropy value;
    determine that the second entropy value is substantially different from the first entropy value; and
    perform, or cause another computer to perform, a predetermined action regarding the malware, wherein the predetermined action comprises at least one of: locking one or more files of the plurality of stored files, making one or more of the files of the plurality of stored files to be read-only, causing the modified version to be recorded as a new file or as a different version of the file, causing a copy of one or more files of the plurality of stored files to be sent to a backup server, postponing a scheduled destruction, or erasure of a backup file, stopping any scheduled destruction, or erasure of a backup, marking the file or the modified version as encrypted, or marking a cached-block as encrypted.

16. The system of claim 15 wherein the one or more computing devices are further configured to compare the second entropy value with the first entropy value of the file by:
  determining a percentage of change for the second entropy value with respect to the first entropy value; and
  determining that the percentage of change exceeds a percentage threshold value.

17. The system of claim 15 wherein the one or more computing devices are further configured to compare the second entropy value with the first entropy value of the file by:
  determining a first log of the first entropy value;
  determining a second log of the second entropy value;
  determining a ratio of the second log to the first log; and
  determining that the ratio exceeds a ratio threshold value.

18. A computer storage medium having computer-executable instructions stored thereupon to detect and act with respect to malware and which, when executed by a computer, cause the computer to:
- for a plurality of stored files, calculate and store respective first entropy values for individual files of the stored files;
- subsequent to the calculate and store of the first entropy values, determine that a predetermined event has occurred with respect to a file of the plurality of stored files, the predetermined event being at least one of: occurrence of a predetermined date, occurrence of a predetermined time, elapse of a predetermined amount time since a last predetermined event occurred, creation of a new file, storage of a new file, modification of the file to produce a modified version of the file, a write operation, an instruction to write to the file to produce a modified version of the file, or a read operation;
- calculate a second entropy value, the second entropy value being for:
  - a current version of the file when the predetermined event is occurrence of a predetermined date, occurrence of a predetermined time, elapse of a predetermined amount time since a last predetermined event occurred, or a read operation;
  - the modified version when the predetermined event is modification of the file, or an instruction to write to the file; or
  - the new file when the predetermined event is creation of the new file, storage of the new file, or a write operation;
- compare the second entropy value with the first entropy value;
- determine that malware may be present based on the second entropy value being substantially different from the first entropy value; and
- perform, or cause another computer to perform, a predetermined action regarding the malware, wherein the predetermined action comprises at least one of: locking one or more files of the plurality of stored files, making one or more of the files of the plurality of stored files to be read-only, causing the modified version to be recorded as a new file or as a different version of the file, causing a copy of one or more files of the plurality of stored files to be sent to a backup server, postponing a scheduled destruction, or erasure of a backup file, stopping any scheduled destruction, or erasure of a backup file, marking the file or the modified version as encrypted, or marking a cached-block as encrypted.

19. The computer storage medium of claim 18 having further computer-executable instructions stored thereupon which, when executed by the computer, cause the computer to compare the second entropy value with first entropy value by:
- determining a percentage of change for the second entropy value with respect to the first entropy value; and
- determining that the percentage of change exceeds a percentage threshold value.

20. The computer storage medium of claim 18 having further computer-executable instructions stored thereupon which, when executed by the computer, cause the computer to compare the second entropy value with first entropy value by:
- determining a first log of the first entropy value;
- determining a second log of the second entropy value;
- determining a ratio of the second log to the first log; and
- determining that the ratio exceeds a ratio threshold value.

* * * * *